US012292978B1

United States Patent
Sundararaman et al.

(10) Patent No.: US 12,292,978 B1
(45) Date of Patent: May 6, 2025

(54) SYSTEM AND METHOD FOR SRAM LESS ELECTRONIC DEVICE BOOTUP USING CACHE

(71) Applicant: Marvell Asia Pte Ltd, Singapore (SG)

(72) Inventors: Ramacharan Sundararaman, San Jose, CA (US); Avinash Sodani, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 423 days.

(21) Appl. No.: 17/516,915

(22) Filed: Nov. 2, 2021

Related U.S. Application Data

(60) Provisional application No. 63/112,500, filed on Nov. 11, 2020.

(51) Int. Cl.
*G06F 21/57* (2013.01)
*G06F 3/06* (2006.01)
*G06F 21/54* (2013.01)

(52) U.S. Cl.
CPC ............ *G06F 21/575* (2013.01); *G06F 3/062* (2013.01); *G06F 3/0632* (2013.01); *G06F 3/0679* (2013.01); *G06F 21/54* (2013.01)

(58) Field of Classification Search
CPC ...... G06F 3/062; G06F 3/0631; G06F 3/0632; G06F 3/0634; G06F 3/0679; G06F 21/54; G06F 21/575
USPC ........................................................ 711/118
See application file for complete search history.

(56) References Cited

U.S. PATENT DOCUMENTS

| | | | | |
|---|---|---|---|---|
| 5,809,531 A | * | 9/1998 | Brabandt | G06F 9/4403 713/1 |
| 9,880,933 B1 | * | 1/2018 | Gupta | G06F 3/0656 |
| 11,126,573 B1 | * | 9/2021 | Rohleder | G06F 13/1668 |
| 11,409,540 B1 | * | 8/2022 | Grohoski | G06F 15/80 |
| 2002/0120810 A1 | * | 8/2002 | Brouwer | G06F 12/0638 711/E12.083 |
| 2002/0120845 A1 | * | 8/2002 | Cromer | G06F 21/57 713/168 |
| 2002/0156970 A1 | * | 10/2002 | Stewart | G06F 9/4401 711/E12.019 |

(Continued)

OTHER PUBLICATIONS

Evgeniy Stepanov and Konstantin Serebryany. 2015. MemorySanitizer: fast detector of uninitialized memory use in C++. In Proceedings of the 13th Annual IEEE/ACM International Symposium on Code Generation and Optimization (CGO '15). IEEE Computer Society, USA, 46-55. (Year: 2015).*

*Primary Examiner* — Reginald G Bragdon
*Assistant Examiner* — Aaron D Ho

(57) ABSTRACT

A new approach is proposed to support SRAM less bootup of an electronic device. A portion of a cache unit of a processor is utilized as a SRAM to maintain data to be accessed via read and/or write operations for bootup of the electronic device. First, the portion of the cache unit is mapped to a region of a memory, which has not been initialized. The processor reads data from a non-modifiable storage to be used for the bootup process of the electronic device and writes the data into the portion of the cache unit serving as the SRAM. To prevent having to read or write to the uninitialized memory, any read operation to the memory region returns a specific value and any write operation to the memory region is dropped. The processor then accesses the data stored in the portion of the cache unit to bootup the electronic device.

26 Claims, 4 Drawing Sheets

(56) References Cited

U.S. PATENT DOCUMENTS

| | | | | |
|---|---|---|---|---|
| 2004/0199722 A1* | 10/2004 | Dodson | ............... | G06F 11/364 |
| | | | | 714/E11.207 |
| 2005/0086464 A1* | 4/2005 | Lee | ............... | G06F 9/4401 |
| | | | | 713/100 |
| 2008/0040561 A1* | 2/2008 | Bryant | ............... | G06F 9/5016 |
| | | | | 711/170 |
| 2008/0256295 A1* | 10/2008 | Lambert | ............... | G06F 12/0866 |
| | | | | 711/E12.019 |
| 2014/0229942 A1* | 8/2014 | Wiseman | ............... | G06F 9/468 |
| | | | | 718/1 |
| 2014/0281316 A1* | 9/2014 | Sano | ............... | G06F 11/1451 |
| | | | | 714/6.2 |
| 2014/0365861 A1* | 12/2014 | Lasmarias | ............... | G06F 9/54 |
| | | | | 715/234 |
| 2017/0177482 A1* | 6/2017 | Greenspan | ............... | G06F 12/0815 |
| 2020/0135151 A1* | 4/2020 | Jiang | ............... | G06F 1/24 |
| 2020/0183859 A1* | 6/2020 | Johns | ............... | H04L 67/1097 |
| 2020/0364094 A1* | 11/2020 | Kahle | ............... | G06F 12/0842 |
| 2021/0181966 A1* | 6/2021 | Xu | ............... | G06F 3/061 |
| 2021/0318932 A1* | 10/2021 | Yigzaw | ............... | G06F 11/1064 |
| 2022/0084566 A1* | 3/2022 | Iwai | ............... | G11C 7/106 |
| 2022/0164254 A1* | 5/2022 | Smittle | ............... | G06F 11/1405 |

* cited by examiner

SYSTEM AND METHOD FOR SRAM LESS ELECTRONIC DEVICE BOOTUP USING CACHE

CROSS-REFERENCE TO RELATED APPLICATIONS

This application claims the benefit and the priority to the U.S. Provisional Patent Application No. 63/112,500, filed Nov. 11, 2020, which is incorporated herein in its entirety by reference.

BACKGROUND

Device security is becoming more and more important given the prevalent use and the personal nature of electronic devices. Any gap in security of an electronic device may expose the electronic device to a malicious attack. When the malicious attack happens, the electronic device needs to be booted up via a (secured) bootup process by executing a Root of Trust (RoT) or Trusted/Secure Boot code from a non-modifiable storage medium such as a read only memory (ROM), e.g., a Boot ROM or Bootrom. Here, the RoT stored on the non-modifiable storage medium includes a set of trusted functions/codes/instructions and/or an initialization sequence that can be executed by the bootup process. The Trusted Boot code can also be executed to initialize data that is used as part of the bootup process. The security algorithms/methods/mechanisms used by the bootup process, however, often require significant additional read/write memory for various data structures (e.g., including but not limited to for stack, heap, etc.) used during the bootup process before a mass storage medium such as dynamic random-access memory (DRAM) on the electronic device has been initialized and ready to be accessed via read or write operations. To meet the memory requirement of the security algorithms of the bootup process, some current approaches use a dedicated static random-access memory (SRAM) or require processor caches that operate in special RAM mode. However, adding the dedicated SRAM that is only used for this purpose at bootup time is wasteful in terms of chip area and power consumption. Additionally, using the processor caches in the special RAM mode requires additional hardware (e.g., cache control logic) to control the processor caches to prevent cache eviction and may not be supported in certain CPU architectures.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
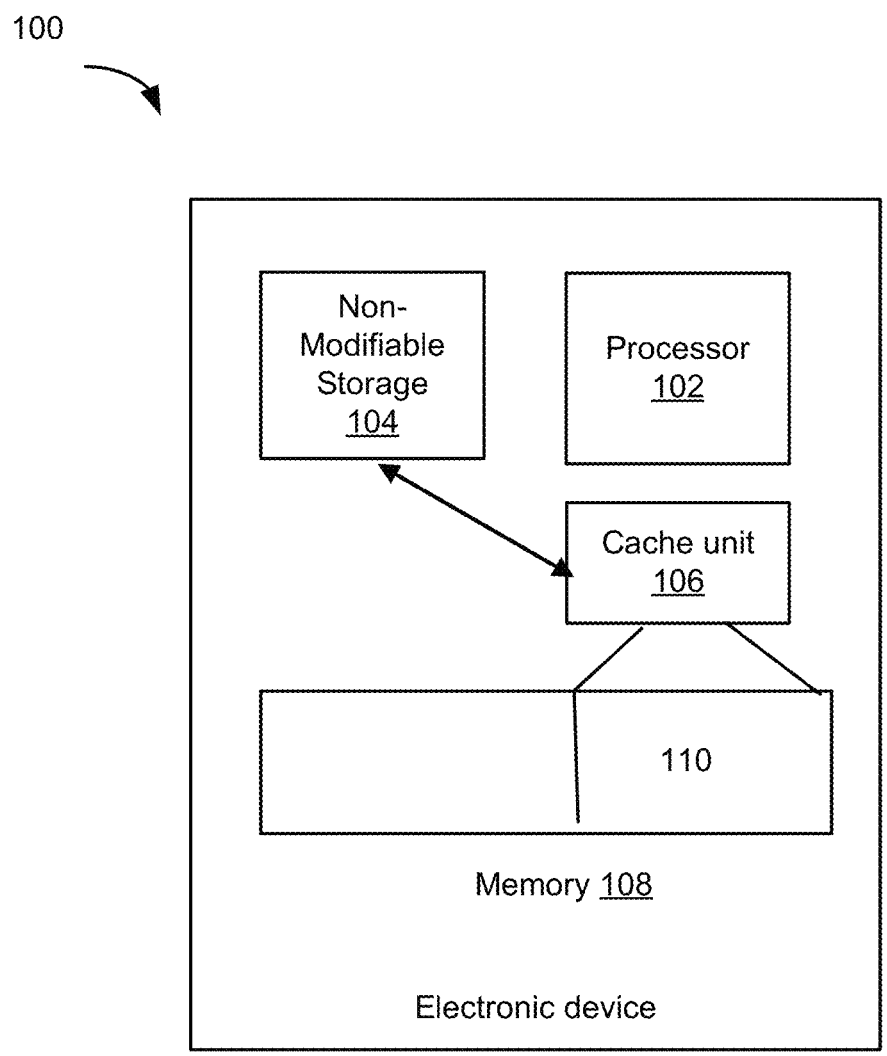
FIGS. 1A-1C depict an example of a diagram of a system configured to support SRAM less bootup of an electronic device according to an aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates systems and methods to support SRAM less bootup of an electronic device. Under the proposed approach, a portion of a cache unit (e.g., an L2 cache) of a processor (e.g., an application processor) of the electronic device is utilized as an SRAM to maintain/store data to be accessed via read and/or write operations for an initial bootup process of the electronic device. First, address space of the portion of the cache unit is mapped to a region of a memory (e.g., DRAM), which has not been initialized and is not ready to be accessed via a read or write operation. During the bootup process of the electronic device, the processor reads data from a non-modifiable storage (e.g., Boot ROM) to be used for the bootup process of the electronic device and writes the data into the portion of the cache unit serving as the SRAM. To prevent having to read the uninitialized memory, a read operation to the uninitialized memory region mapped to the portion of the cache unit returns a specific value, e.g., value 0. To prevent having to write to the uninitialized memory, a write operation to the uninitialized memory region mapped to the portion of the cache unit is dropped. The processor then accesses the data stored in the portion of the cache unit to bootup the electronic device.

Since the proposed approach utilizes the cache unit of the processor to store data for read and write operations during the bootup process of the electronic device, no separate or dedicated SRAM is needed for bootup. In addition, the proposed approach does not require any specialized hardware in order for the cache unit to operate in a special RAM mode during the bootup process. In some embodiments, since the processor needs to access data from the non-modifiable storage (which can be very time-consuming) only once and to read from the cache unit (which can be very fast) during the bootup process instead, the proposed approach may speed up the bootup of the electronic device. Furthermore, since the proposed approach is hardware-enforced, its security and reliability cannot be easily compromised.

As referred to herein, the data read from the non-modifiable storage and/or written into the cache unit of the processor includes but is not limited to any information, instructions, codes, or sequences used and/or executed during the bootup process of the electronic device. Also as referred to herein, cache eviction means selecting one line of existing data at an address in the cache unit and writing the cache line back to the memory mapped to the cache unit so that new data can be written to the same address in the cache unit. SRAM, on the other hand, allows the new data to overwrite the existing data at the same address without writing the existing data back to another memory or storage.

Figure 1B:
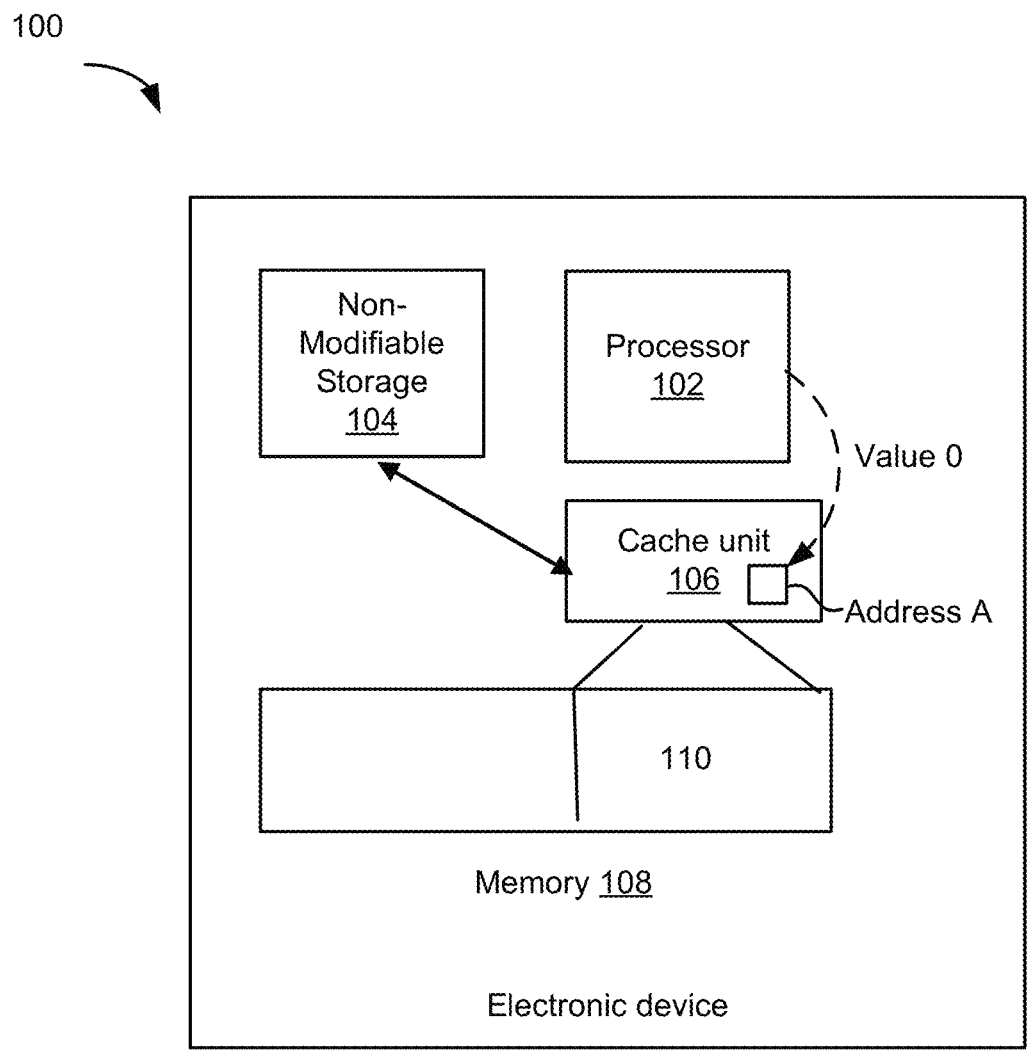
Figure 1C:
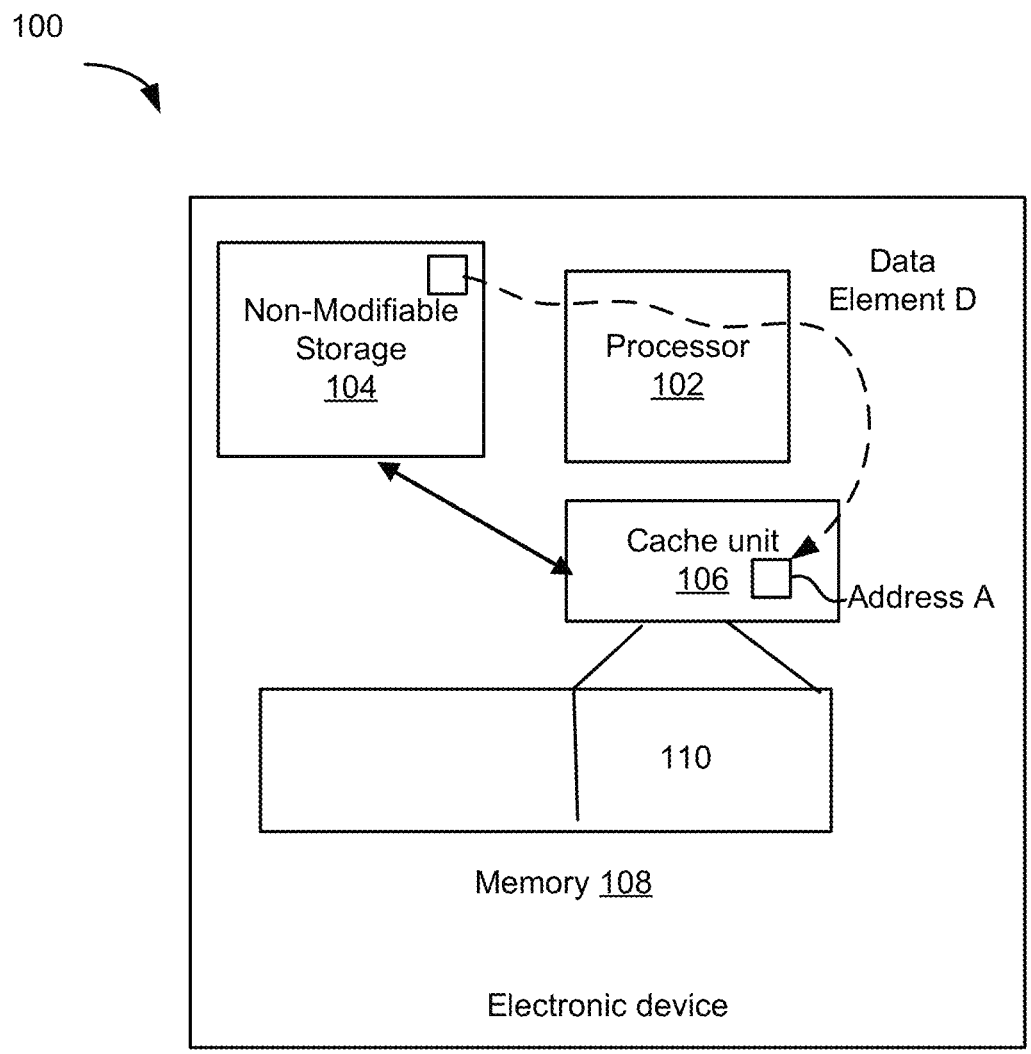

FIGS. 1A-1C depict an example of a diagram of a system 100 configured to support SRAM less bootup of an electronic device. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIGS. 1A-1C, the system 100 includes at least a processor 102, a non-modifiable storage medium 104, a cache unit 106 associated with the processor 102, and a memory unit 108 of an electronic device. Each of these components in the system 100 is a dedicated hardware block/component or a software running on such hardware block/component. In some embodiments, one or more of these components are programmable by a user at a host (not shown) via software instructions for various operations. When the software instructions are executed by a processor, the one or more hardware components becomes a special purposed hardware component for practicing certain functions. In some embodiments, the components of the system 100 is on a single chip, e.g., a system-on-chip (SOC).

In the example of FIGS. 1A-1C, the non-modifiable storage medium 104 is configured to maintain one or more of read-only data, instructions, and/or an initialization sequence, wherein such data, instructions, and/or initialization sequence can be accessed and/or executed by the processor 102 to boot up the electronic device. Here, the non-modifiable storage medium 104 can be, for a non-limiting example, a Bootrom or Boot ROM, which is a piece of read-only memory (ROM), or a write-protected flash memory embedded inside the electronic device. The non-modifiable storage medium 104 contains the data, instructions, and/or initialization sequences to be executed on power-on, reset or boot up of the electronic device. In some embodiments, the non-modifiable storage medium 104 includes a set of functions such as Roots of Trust (RoT), which are trusted functions that can be utilized by the processor 102 to execute the initialization sequence to bootup the electronic device.

In the example of FIGS. 1A-1C, the cache unit 106 of the processor 102 is configured to maintain data for fast and/or frequent access by the processor 102. In some embodiments, a portion of the cache unit 106 is configured to function as an SRAM and to maintain the data and/or instructions to be executed by the processor 102 to bootup the electronic device without cache eviction of the cache unit 106. Here, the portion of the cache unit 106 is mapped to a special region 110 of the memory 108, wherein the size (e.g., number of lines in the address space) of the special region 110 is the same or larger than the size of the portion of the cache unit 106 served as the SRAM to the processor 102. The portion of the cache unit 106 can be of any size (e.g., from half to full size of the cache unit 106). In some embodiments, the processor 102 is first configured to read data from the non-modifiable storage medium 104 and then write the data to the portion of the cache unit 106 served as the SRAM for fast and/or repeated access during the bootup process of the electronic device. As such, the processor 102 only needs to access the non-modifiable storage medium 104, which is slow, only once. The processor 102 may then access the portion of the cache unit 106, which is fast, one or more times for the data and/or instruction needed during the bootup process of the electronic device.

In some embodiments, the processor 102 is configured to write data read from the non-modifiable storage medium 104 to the portion of the cache unit 106 by attempting to write data element D the processor 102 read from the non-modifiable storage medium 104 to the special memory region 110 mapped to the portion of the cache unit 106 at address A in the following steps:

First, the processor 102 checks whether the data at address A exists in the portion of the cache unit 106.

Since no data at address A has been loaded into the portion of the cache unit 106, the check will result in a cache miss.

The processor 102 then initiates a read operation to read data at address A of the special memory region 110.

Instead of returning data that exists at address A of the special memory region 110, which has not been initialized yet, the read operation will return one or more value 0 s, which are written by the processor 102 at address A in the portion of the cache unit 106, as shown in FIG. 1B. Since the Trusted Boot Code always initializes the data used as part of the security algorithms/mechanisms, the initial value 0 s is perfectly fine for the bootup process.

Since data (the value 0 s) now exists at address A in the portion of the cache unit 106, the processor 102 is able to write data element D read from the non-modifiable storage medium 104 to address A in the portion of the cache unit 106, as shown in FIG. 1C. Note that in order to prevent the effect of cache eviction, all write operations to the mapped special memory region 110 are dropped. Specifically, the current value at address A in the portion of the cache unit 106 is overwritten by the processor 102 and is not written back to address A in the special memory region 110 as under the cache eviction. In some embodiments, the address A of the dropped write operation is optionally recorded and reported back in case a subsequent read operation accesses the same address.

In some embodiments, if the processor 102 attempts to write data element D' to the special memory region 110 at address A', which happens to be mapped to the same address A in the portion of the cache unit 106, the processor 102 will overwrite/replace the current data element D at address A with the data element D', wherein the data element D is dropped without being written back to the special memory region 110, which has not been initialized and ready to be accessed for read or write operations. In some embodiments, the dropped data element D may be reported back to the processor 102 and optionally processed, e.g., by the Trusted Boot Code, as an error condition in case the dropped data element D has to be read back.

Once the data has been read once from the non-modifiable storage medium 104 and then written to the portion of the cache unit 106 serving as the SRAM, the processor 102 is configured to implement the bootup process of the electronic device by repeatedly accessing the portion of the cache unit 106 via one or more read or write operations. Specifically, in some embodiments, the data maintained in the portion of the cache unit 106 is utilized by the processor 102 to implement one or more security algorithms/mechanisms by setting up one or more data structures including but not limited to stack, heap, and/or vector during the bootup process of the electronic device. In some embodiments, the initialization sequence and/or instructions stored in the portion of the cache unit 106 is executed by the processor 102 to bootup the electronic device, wherein the initialization sequence may include a branch statement or code, which causes the processor 102 to begin branching and executing a different part of the initialization sequence at an execute-in-place (XIP) base address. In some embodiments, the processor 102 is configured to execute the instructions read from the portion of the cache unit 106 based on the post silicon characterization of the electronic device.

Figure 2:
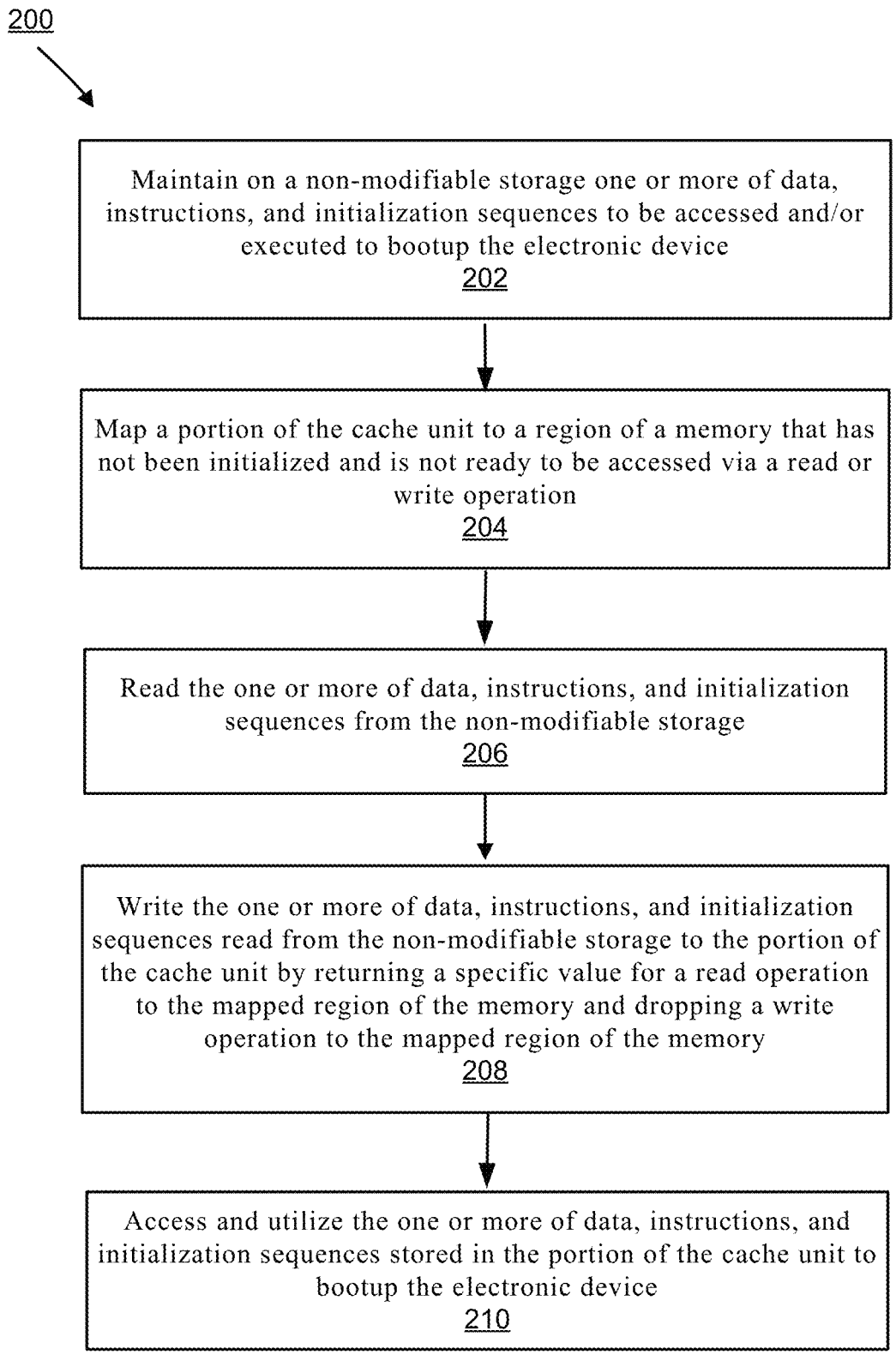
FIG. 2 depicts a flowchart of an example of a process to support SRAM less bootup of an electronic device according to an aspect of the present embodiments.

FIG. 2 depicts a flowchart 200 of an example of a process to support SRAM less bootup of an electronic device. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where one or more of data, instructions, and initialization sequences to be accessed and/or executed to bootup the electronic device are maintained on a non-modifiable storage. The flowchart 200 continues to block 204, where a portion of the cache unit is mapped to a region of a memory that has not been initialized and is not ready to be accessed via a read or write operation. The flowchart 200 continues to block 206, where the one or more of data, instructions, and initialization sequences is read from the non-modifiable storage. The flowchart 200 continues to block 208, where the one or more of data, instructions, and initialization sequences read from the non-modifiable storage is written to the portion of the cache unit by returning a specific value for a read operation to the mapped region of the memory and dropping a write operation to the mapped region of the memory. The flowchart 200 ends at block 210, where the one or more of data, instructions, and initialization sequences stored in the portion of the cache unit is accessed and utilized to bootup the electronic device.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system to support an electronic device, comprising:
   a non-modifiable storage configured to maintain one or more of data, instructions, and initialization sequences to be accessed and/or executed to bootup the electronic device;
   a cache unit, wherein a portion of the cache unit is associated with a region of a memory that has not been initialized and is not ready to be accessed via a read or write operation; and
   a processor configured to
      determine whether the portion of the cache unit includes the one or more of data, instructions, and initialization sequences;
      write a specific value in the portion of the cache unit in response to determining that the portion of the cache unit does not include the one or more of data, instructions, and initialization sequences;
      subsequent to writing the specific value, write the one or more of data, instructions, and initialization sequences read from the non-modifiable storage to the portion of the cache unit;
      drop a write operation to the associated region of the memory, wherein an address associated with the dropped write operation is recorded, and wherein the address associated with the dropped write operation is used in a subsequent read operation access to the address associated with the dropped write operation; and
      access and utilize the one or more of data, instructions, and initialization sequences stored in the portion of the cache unit to bootup the electronic device.

2. The system of claim 1, wherein:
the non-modifiable storage medium is a read only memory (ROM) or a write-protected flash in the electronic device.

3. The system of claim 1, wherein:
the non-modifiable storage medium includes a set of functions to be utilized to execute the initialization sequence to bootup the electronic device.

4. The system of claim 1, wherein:
the specific value is value 0.

5. The system of claim 1, wherein:
the portion of the cache unit is configured to function as a static random-access memory (SRAM) to maintain the data and/or instructions to be executed to bootup the electronic device.

6. The system of claim 5, wherein:
a size of the region of the memory is the same or larger than a size of the portion of the cache unit functioning as the SRAM.

7. The system of claim 1, wherein:
the processor is configured to read the one or more of data, instructions, and initialization sequences from the non-modifiable storage only once.

8. The system of claim 1, wherein:
the processor is configured to write the one or more of data, instructions, and initialization sequences read from the non-modifiable storage to the portion of the cache unit while preventing access to the associated region of the memory.

9. The system of claim 1, wherein the processor is configured to write the data read from the non-modifiable storage medium to the portion of the cache unit by initially writing the specific value into the cache unit and subsequently writing the data from the non-modifiable storage to the portion of the cache unit.

10. The system of claim 1, wherein:
the processor is configured to first write the specific value from the read operation to an address of the portion of the cache unit.

11. The system of claim 10, wherein:
the processor is configured to overwrite the specific value with the data read from the non-modifiable storage medium at the address of the portion of the cache unit without writing the specific value back to the region of the memory associated to the portion of the cache unit.

12. The system of claim 1, wherein:
the processor is configured to overwrite and drop current data at an address in the portion of the cache unit with new data if the new data is to be written to the same address in the portion of the cache unit without writing the current data back to the region of the memory.

13. The system of claim 12, wherein:
the processor is configured to handle the dropped data as an error condition in case the dropped data has to be read back.

14. The system of claim 1, wherein:
the processor is configured to utilize the data maintained in the portion of the cache unit to implement one or more security mechanisms by setting up one or more data structures during the bootup process of the electronic device.

15. A method to support an electronic device, comprising:
maintaining on a non-modifiable storage one or more of data, instructions, and initialization sequences to be accessed and/or executed to bootup the electronic device;
associating a portion of the cache unit to a region of a memory that has not been initialized and is not ready to be accessed via a read or write operation;
determining whether the portion of the cache unit includes the one or more of data, instructions, and initialization sequences;
writing a specific value in the portion of the cache unit in response to determining that the portion of the cache unit does not include the one or more of data, instructions, and initialization sequences;
subsequent to writing the specific value, writing the one or more of data, instructions, and initialization sequences read from the non-modifiable storage to the portion of the cache unit;
dropping any write operation to the associated region of the memory, wherein an address associated with the dropped write operation is recorded, and wherein the address associated with the dropped write operation is used in a subsequent read operation access to the address associated with the dropped write operation; and
accessing and utilizing the one or more of data, instructions, and initialization sequences stored in the portion of the cache unit to bootup the electronic device.

16. The method of claim 15, wherein:
the specific value is value 0.

17. The method of claim 15, further comprising:
utilizing the portion of the cache unit as a static random-access memory (SRAM) to maintain the data and/or instructions to be executed to bootup the electronic device.

18. The method of claim 15, further comprising:
reading the one or more of data, instructions, and initialization sequences from the non-modifiable storage only once.

19. The method of claim 15, further comprising:
writing the one or more of data, instructions, and initialization sequences read from the non-modifiable storage to the portion of the cache unit while preventing access to the associated region of the memory.

20. The method of claim 15, the method further comprising:
writing the data read from the non-modifiable storage medium to the portion of the cache unit by initially writing the specific value into the cache unit and subsequently writing the data to the portion of the cache unit.

21. The method of claim 15, further comprising:
writing the specific value from the read operation to an address of the portion of the cache unit first.

22. The method of claim 21, further comprising:
overwriting the specific value with the data read from the non-modifiable storage medium at the address of the portion of the cache unit without writing the specific value back to the region of the memory associated to the portion of the cache unit.

23. The method of claim 15, further comprising:
overwriting and dropping current data at an address in the portion of the cache unit with new data if the new data is to be written to the same address in the portion of the cache unit without writing the current data back to the region of the memory.

24. The method of claim 23, further comprising:
handling the dropped data as an error condition in case the dropped data has to be read back.

25. The method of claim 15, further comprising:
utilizing the data maintained in the portion of the cache unit to implement one or more security mechanisms by setting up one or more data structures during the bootup process of the electronic device.

26. A system to support an electronic device, comprising:
a non-modifiable storage means for maintaining one or more of data, instructions, and initialization sequences to be accessed and/or executed to bootup the electronic device;
a cache means, wherein a portion of the cache means is associated to a region of a memory that has not been initialized and is not ready to be accessed via a read or write operation;
a means for determining whether the portion of the cache means includes the one or more of data, instructions, and initialization sequences;
a means for writing a specific value in the portion of the cache means in response to determining that the portion of the cache means does not include the one or more of data, instructions, and initialization sequences;
a means for writing the one or more of data, instructions, and initialization sequences read from the non-modifiable storage means to the portion of the cache means subsequent to writing the specific value;
a means for dropping a write operation to the associated region of the memory, wherein an address associated with the dropped write operation is recorded, and wherein the address associated with the dropped write operation is used in a subsequent read operation access to the address associated with the dropped write operation; and
a means for accessing and utilizing the one or more of data, instructions, and initialization sequences stored in the portion of the cache means to bootup the electronic device.

* * * * *